(12) United States Patent
Lahoda

(10) Patent No.: US 10,593,434 B2
(45) Date of Patent: Mar. 17, 2020

(54) CERAMIC REINFORCED ZIRCONIUM ALLOY NUCLEAR FUEL CLADDING WITH INTERMEDIATE OXIDATION RESISTANT LAYER

(71) Applicant: WESTINGHOUSE ELECTRIC COMPANY LLC, Cranberry Township, PA (US)

(72) Inventor: Edward J. Lahoda, Edgewood, PA (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 1572 days.

(21) Appl. No.: 14/205,967

(22) Filed: Mar. 12, 2014

(65) Prior Publication Data

US 2020/0048766 A1  Feb. 13, 2020

(51) Int. Cl.
| | | |
|---|---|---|
| *G21C 3/07* | (2006.01) | |
| *G21C 3/20* | (2006.01) | |
| *G21C 21/02* | (2006.01) | |
| *G21C 3/10* | (2006.01) | |

(52) U.S. Cl.
CPC ............. *G21C 3/07* (2013.01); *G21C 3/20* (2013.01); *G21C 21/02* (2013.01); *G21C 3/10* (2013.01)

(58) Field of Classification Search
CPC ... G21C 3/02; G21C 3/06; G21C 3/10; G21C 3/16; G21C 3/17; G21C 3/344; G21C 21/02; G21C 3/07; G21C 3/20
USPC ................. 376/414, 416, 417, 451
See application file for complete search history.

(56) References Cited

U.S. PATENT DOCUMENTS

| | | | | |
|---|---|---|---|---|
| 3,327,892 A | * | 6/1967 | Lloyd | G21C 3/10 |
| | | | | 376/451 |
| 2006/0039524 A1 | * | 2/2006 | Feinroth | C04B 35/806 |
| | | | | 376/409 |
| 2009/0220040 A1 | | 9/2009 | Takagi | |
| 2012/0294403 A1 | * | 11/2012 | Bertch | G21G 1/02 |
| | | | | 376/185 |
| 2013/0010915 A1 | | 1/2013 | Garnier et al. | |

(Continued)

FOREIGN PATENT DOCUMENTS

| | | |
|---|---|---|
| EP | 0644864 B1 | 12/1996 |
| JP | 2013113682 A | 6/2013 |

(Continued)

OTHER PUBLICATIONS

International Searching Authority, International Search Report and the Written Opinion for International Application No. PCT/US2015/015351, dated Nov. 27, 2015.

*Primary Examiner* — Jack W Keith
*Assistant Examiner* — Daniel Wasil
(74) *Attorney, Agent, or Firm* — K&L Gates LLP

(57) ABSTRACT

The invention relates to compositions and methods for coating a zirconium alloy (e.g., ceramic-containing) cladding tube for use with fuel rods in a nuclear water reactor. The coating includes an intermediate oxidation resistant layer and a SiC containing layer at least partially deposited on the intermediate oxidation resistant layer. The SiC containing layer can include a plurality of fibers. The SiC containing layer may also be on the outer surface of end plugs. The invention provides improved capability for the zirconium alloy cladding to withstand normal and accident conditions in the nuclear water reactor.

16 Claims, 3 Drawing Sheets

(56) References Cited

U.S. PATENT DOCUMENTS

| | | | |
|---|---|---|---|
| 2014/0192949 A1* | 7/2014 | Feinroth | C04B 35/565 376/451 |
| 2014/0254740 A1* | 9/2014 | Ledford | G21C 3/07 376/417 |
| 2015/0063523 A1* | 3/2015 | Yacout | G21C 3/20 376/416 |
| 2015/0078505 A1* | 3/2015 | Xu | C04B 37/001 376/451 |

FOREIGN PATENT DOCUMENTS

| | | |
|---|---|---|
| WO | 2012174548 A1 | 12/2012 |
| WO | 2013017621 A1 | 2/2013 |

\* cited by examiner

CERAMIC REINFORCED ZIRCONIUM ALLOY NUCLEAR FUEL CLADDING WITH INTERMEDIATE OXIDATION RESISTANT LAYER

GOVERNMENT SUPPORT AND FUNDING

The invention was made with government support under grant # DE-NE0000566 awarded by the Department of Energy. The government has certain rights in the invention.

BACKGROUND

1. Field

The invention relates to methods of manufacturing a zirconium alloy cladding having a ceramic-containing coating formed thereon including an oxidation resistant layer for use in a nuclear water reactor and, in particular, an improved capability for the zirconium alloy cladding to withstand normal and accident conditions to which it is exposed in the nuclear water reactor.

2. Description of Related Art

In a typical nuclear water reactor, such as a pressurized water reactor (PWR), heavy water reactor (e.g., a CANDU) or a boiling water reactor (BWR), the reactor core includes a large number of fuel assemblies, each of which is composed of a plurality of elongated fuel elements or fuel rods. Fuel assemblies vary in size and design depending on the desired size of the core and the size of the reactor. The fuel rods each contain nuclear fuel fissile material, such as at least one of uranium dioxide ($UO_2$), plutonium dioxide ($PuO_2$), thorium dioxide ($ThO_2$), uranium nitride (UN) and uranium silicide ($U_3Si_2$) and mixtures thereof. At least a portion of the fuel rods can also include neutron absorbing material, such as, boron or boron compounds, gadolinium or gadolinium compounds, erbium or erbium compounds and the like. The neutron absorbing material may be present on or in pellets in the form of a stack of nuclear fuel pellets. Annular or particle forms of fuel also can be used.

Each of the fuel rods has a cladding that acts as containment to hold the fissile material. The fuel rods are grouped together in an array which is organized to provide a neutron flux in the core sufficient to support a high rate of nuclear fission and thus, the release of a large amount of energy in the form of heat. A coolant, such as water, is pumped through the reactor core to extract the heat generated in the reactor core for the production of useful work such as electricity.

The cladding on the fuel rods may be composed of zirconium (Zr) and may include as much as about two percent by weight of other metals, such as niobium (Nb), tin (Sn), iron (Fe) and chromium (Cr). Recent developments in the art have provided fuel rod cladding composed of a ceramic-containing material, such as silicon carbide (SiC). SiC has been shown to exhibit desirable properties in beyond design basis accidents, e.g., a temperature of greater than 1200° C. and therefore, may be considered a suitable material of construction for nuclear fuel rod claddings. However, maintaining fission gas impermeability during flexing induced by handling or accidents or natural phenomena, such as earthquakes, is difficult due to the natural inelasticity of ceramic materials generally. Fastening end plugs on SiC tubes in a high throughput, economic manner yielding a hermetic seal at temperatures beyond 1200° C. is also difficult. The use of an inner sleeve composed of a Zr alloy wrapped with SiC fibers has been attempted but has failed due to excessive corrosion encountered during chemical vapor infiltration (CVI) when SiC is deposited within and on the SiC fibers to hold them together. Thus, issues relating to nuclear fuel rod cladding remained, including corrosion of the Zr tube at temperatures associated with a nuclear water reactor core, e.g., about 800 to about 1200° C., and the chemical conditions, e.g., gas containing $H_2$, $Cl_2$ and HCl, encountered during the CVI process.

It has also been attempted to make the SiC winding separately, subject it to CVI, and then fit it over the Zr tube. However, there are issues with this approach as well. For example, the space between the Zr tube and the SiC composite matrix forms an additional heat transfer barrier within the cladding layer, which could cause fuel centerline melt at the very high linear heat generation rates encountered by nuclear fuel (normally greater than 5 kw/ft). Because the ends of the tube are not covered, there is a potential for the Zr tube to slip from the SiC composite sleeve and provide a pathway for high temperature steam and other gases to infiltrate below the SiC composite and attack the Zr alloy tube.

Each of the fuel rods/cladding has a plug or cap positioned at each end. Further, a hold down device, such as a metal spring, is provided in the fuel rod/cladding to maintain the configuration of the stack of nuclear fuel pellets.

FIG. 1 illustrates a prior art design which shows a stack of fuel pellets 10, a zirconium-based cladding 12, a spring hold down device 14, and end plugs 16. One of the end plugs, i.e., the one positioned closest to the hold down device 14, is typically referred to as the top end plug.

It is necessary to seal the end plugs of the cladding to isolate the fuel contained therein from the reactor core environment. There are known sealing technologies that employ various materials such as Ti-based or Al—Si based compositions as well as brazing and other conventional methods to seal SiC cladding and end plugs.

It is an object of this invention to provide methods for manufacturing a SiC reinforced Zr alloy nuclear fuel cladding using an intermediate coating layer which contains an oxidation and corrosion resistant material, such as but not limited to, $Al_2O_3$, $Cr_2O_3$ and mixtures thereof, in order to protect the underlaying zirconium tube from oxidation or corrosion during the CVI process. In order for the fuel to maintain its geometry and to resist a loss of fuel from the core through melting, a covering or coating that is capable of withstanding high temperature needs to be formed on at least a portion of the exterior surface of a nuclear fuel rod cladding composed of zirconium alloy.

SUMMARY OF THE INVENTION

In one aspect, the invention provides a method of coating a ceramic-containing nuclear fuel rod cladding for a nuclear water reactor. The cladding includes a tubular wall having an interior surface and an exterior surface, the tubular wall forming a cavity therein and having a first open end and a second open end. The method further includes providing a first end plug, inserting and sealing the first end plug into the first open end of the cladding, filling the fuel rod cladding with nuclear fuel and a hold down device, inserting and sealing the second end plug into the second open end of the cladding, pressurizing the cavity, providing a first composition including an oxidation resistant material, providing a second composition including silicon carbide, applying the first composition to at least a portion of the exterior surface of the cladding to form a first exterior coating, and applying the second composition to at least a portion of the first exterior coating to form a second exterior coating. The second exterior coating includes depositing SiC reinforced fibers having voids formed between at least a portion of the SiC reinforced fibers; and depositing a SiC material to at least partially fill the voids formed between at least a portion of the SiC reinforced fibers. The second exterior coating substantially encapsulates the exterior surface of the cladding.

In certain embodiments, the method further includes applying the first composition on the interior surface of the cladding to form a first interior coating thereon. The applying of the first interior coating and the first exterior coating may be conducted by atomic layer deposition. The first interior coating and the first exterior coating can have a thickness from 10 nanometers to 10 microns.

An end plug can be positioned within each of the first end and the second end of the cladding. The depositing of the first interior coating can occur when neither or one of the first end plug and the second end plug is positioned within the first open end or the second open end of the cladding.

The depositing of the SiC reinforced fibers in the second exterior coating can be conducted by winding or braiding. The second exterior coating can have a thickness from 10 mils to 40 mils.

In certain embodiments, the second exterior coating has a density of about 3.22 grams/cm$^3$.

The first composition can include $Al_2O_3$, $Cr_2O_3$ and mixtures thereof.

In certain embodiments, depositing of the second exterior coating includes coating an exposed surface of each of the first and second end plugs positioned within the first and second ends of the cladding.

In another aspect, the invention provides a composite for coating a ceramic-containing nuclear fuel rod cladding for a nuclear water reactor. The composite includes a ceramic-containing cladding. The cladding includes a tubular wall having an interior surface and an exterior surface, a cavity formed by the tubular wall, the cavity having nuclear fuel disposed therein, a first open end, and a second open end, a first end plug and a second end plug, the first open end sealed with the first end plug and the second open end sealed with the second end plug. In certain embodiments, each of the first and second end plugs is a metal plug. The first composition is deposited on at least a portion of at least the exterior surface of the cladding to form a first exterior coating. The first composition includes an oxidation resistant material. A second composition is deposited on at least a portion of the first exterior coating to form a second exterior coating. The second coating composition includes a plurality of SiC reinforced fibers deposited on at least a portion of the first exterior coating to form a fiber layer. The fibers have voids formed therebetween. Further, the second coating composition includes a SiC material at least partially applied to the fiber layer to at least partially fill the voids.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
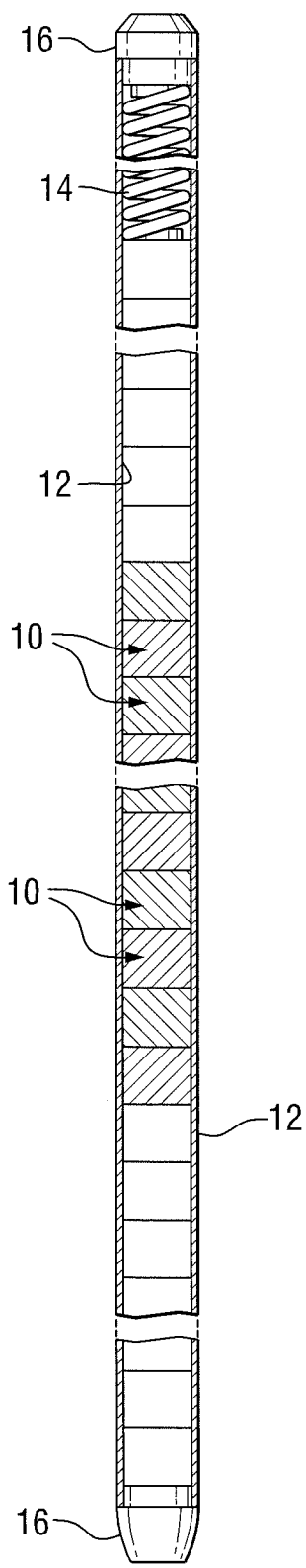
FIG. 1 is an enlarged longitudinal sectional view of a prior art zirconium alloy fuel rod containing fuel pellets, hold down spring, and end caps.

The present invention relates generally to fuel rod cladding, depositing a composition on an exterior surface of the cladding to form a coating thereon, and methods of manufacturing a zirconium alloy nuclear fuel cladding that has the capability to withstand normal and accident conditions in a nuclear water reactor. In certain embodiments, the cladding manufactured in accordance with the invention is able to withstand temperatures in a range from about 800° C. to about 1200° C. Further, the cladding is capable to withstand beyond design basis accidents in a nuclear water reactor.

Generally, the invention includes depositing an oxidation resistant material on, e.g., directly on, the interior surface and/or the exterior surface of the cladding to form a first interior coating and/or a first exterior coating, respectively, and subsequently depositing a SiC composition, e.g., composite, on the first exterior coating to form a second exterior coating thereon.

The cladding may be composed and constructed of a variety of conventional materials known in the art. As previously described herein, it is known to construct fuel rod cladding for a nuclear water reactor from zirconium alloy containing a majority amount of zirconium and a minority amount, e.g., up to about 2% by weight based on total weight of the composition, of other metals. Further, it is known in the art for cladding to be composed of ceramic. Due to the known brittleness associated with ceramic, the cladding material is typically a combination of ceramic and another material, e.g., a ceramic-containing materials, such as but not limited to, silicon carbide (SiC).

Non-limiting examples of suitable cladding materials for use in the invention include silicon carbide (SiC) fiber reinforced composites. These composites may have two or three layers. The two-layer composite includes a cladding of high purity beta or alpha phase stoichiometric SiC at least partially covered by a layer of continuous beta phase stoichiometric SiC fibers infiltrated with beta phase SiC. The three-layer composite includes an additional outer protective layer of fine grained beta phase SiC. In certain instances, it is typical to pre-stress the fiber component forming the fibers into tows and tow reverse winding overlapping, where the fibers are coated with less than one micrometer of carbon or graphite or boron nitride to provide a weak interface allowing fiber slippage. This process may be conducted to improve crack propagation resistance. United States Patent Publication No. 2006/0039524 A1 to Feinroth et al. which is herein incorporated by reference, describes such nuclear fuel tubes and matrix densification using well known processes of chemical vapor infiltration (CVI) or polymer impregnation and pyrolysis (PIP).

The invention is applicable to a wide variety of cladding compositions and designs known in the art, such as but not limited to monolithic, duplex with monolithic SiC on the inside and a composite made with SiC fibers and SiC matrix on the outside, or duplex with a composite made with SiC fibers and SiC matrix on the inside and with a monolith on the outside.

The fuel rod cladding is typically in the shape of an elongated tube having a cavity formed therein and two opposing open ends. The thickness of the tube wall can vary. In certain embodiments, the tube wall thickness is from about 100 to about 1000 microns or from about 200 to 400 microns. The cavity has fuel pellets contained therein and typically a hold down device, such as a spring, to maintain the configuration, e.g., a stack, of the fuel pellets. An end cap or plug is positioned at or in each open end of the cladding to provide a seal and prevent reactor coolant circulating in the core from entering the cavity of fuel rod cladding. The fuel rod cladding is positioned in the core of a nuclear water reactor.

In certain embodiments of the invention, the end plugs are constructed of the same or different material/composition as the cladding. Each of the two end plugs may be inserted into the opposing open ends of the cladding at the same time or one end plug may be inserted prior to the other. Each of the end plugs has a top surface and a bottom surface. When each of the end plugs is inserted into an open end of the cladding, the bottom surface is positioned within the cavity and the top surface forms a closed end of the cladding. In a conventional fuel loading process, one end plug is inserted and attached to an open end of the cladding such as to seal the one end, the fuel pellets and stack hold down spring are then loaded into the cavity of the cladding and following loading, the other end plug is inserted and attached to the other open end of the cladding. As an alternative, the fuel pellets and stack hold down may be loaded into the cladding and subsequently, both of the end plugs may be inserted and attached to the open ends of the cladding.

The end plugs may be attached or sealed to the open ends of the cladding using a variety of compositions, e.g., joining material, and methods. Suitable examples are disclosed in U.S. patent application Ser. No. 14/205,823 which is incorporated herein by reference. Metal end plugs may also be welded onto the ends of the zirconium alloy tube, either singly or together at the same time.

In the invention, the oxidation resistant material can include a wide variety of such compounds known in the art. Non-limiting examples for use in the invention include $Al_2O_3$, $Cr_2O_3$ and mixtures thereof. In certain embodiments, the oxidation resistant material is deposited on at least a portion of the interior and/or exterior surfaces of the cladding, e.g., a Zr alloy cladding, to form a first interior coating and/or a first exterior coating. Thus, in alternate embodiments, the oxidation resistant material can be deposited on the exterior surface only or on both the interior and exterior surfaces of the cladding. It is contemplated that coating of the interior surface allows the Zr alloy material to be resistant to corrosive attack on the inside of the tube in the event of a tube rupture.

Preferably, the tube is loaded with fuel pellets and a hold down spring, and end plugs are attached. The exterior surface is at least substantially covered or completely covered with the oxidation resistant material. The oxidation resistant material may be deposited using conventional apparatus and methods known in the art. In certain embodiments, the oxidation resistant material is deposited using atomic layer deposition. The coating or layer formed by deposition of the oxidation resistant material is typically in the form of a nanolayer having a thickness from about 10 nanometers to about 10 microns or from about 50 nanometers to about 1 micron.

In certain embodiments, wherein the oxidation resistant material is deposited on the interior surface of the cladding tube to form a first interior coating, such deposition is conducted prior to loading of the fuel and hold down device in the cavity, and insertion of the end plugs in the open ends of the cladding. In certain other embodiments, wherein the oxidation resistant material is deposited on the exterior surface of the cladding tube to form a first exterior coating, such deposition may be conducted prior to or following loading of the fuel and hold down device in the cavity, and insertion of the end plugs in the open ends of the cladding.

A first end plug may be inserted and secured, e.g., welded or joined, into or onto a first end of the cladding tube. A joining material may be selected such that it has sufficient strength and high-temperature capability to ensure the joint integrity during a CVI or CVD process that is subsequently conducted in forming the second coating. Further, the joining material may or may not be capable of exhibiting sufficient corrosion resistance in a nuclear reactor environment. The joining material may be deposited on at least a portion of the external surface of the first end plug to form a coating thereon and the coated first end plug inserted into the first open end of the cladding tube to form a seal between the first end plug and the interior surface and/or end face of the cladding tube.

The fuel, e.g., stack of pellets, and the hold down device, e.g., spring, can then be inserted and positioned within the cavity of the tubular cladding. Subsequently, the cladding tube may be pressurized with an inert gas, such as helium (He), as in conventional designs or other backfill gas, e.g., gas having similar or improved thermal conductivity, such as hydrogen. That is, the cavity of the tubular cladding is filled with the gas to a desired pressure. The pressure can vary and in certain embodiments, is from 5 to 50 atmospheres or from 10 to 20 atmospheres. Following loading of the fuel and pressurizing of the tube, the second end plug can then be inserted and secured into the second open end of the cladding tube, in accordance with the method described above for the first end plug.

Alternatively, a central hole or opening may be formed in the second end plug to allow entry of the gas therethrough to pressurize the rod. Afterwards, the hole or opening may be at least partially filled and sealed with the joining material as described above.

In alternate embodiments, the fuel and hold down device may be positioned within the cavity of the tubular cladding prior to inserting and securing either of the first and second end plugs.

The invention includes a dual or two-layer matrix, composite or coating on the exterior surface of the fuel rod cladding which is applied by a two-step method. Further, a single layer or coating of oxidation resistant material may be deposited on the interior surface of the cladding tube. The first step in the two-step method includes deposition of the oxidation resistant material on, e.g., directly on, the interior and/or exterior surfaces of the cladding to form the first interior coating and/or first exterior coating as described above, and the second step includes deposition of a SiC composition, e.g., composite, on the first exterior coating which is deposited on the exterior surface of the cladding to form the second exterior coating on the cladding. The second exterior coating includes a first component and a second component. The first component includes SiC fibers. Thus, following welding or joining of the first and second end plugs to seal the cladding tube, the closed tube is wound or braided with SiC fibers. The winding or braiding typically is conducted such that the process is initiated at the first end plug of the cladding tube and is completed at the opposing second end plug of the cladding tube. The thickness of the deposited SiC fibers may vary and in certain embodiments, the SiC fibers are deposited to form a layer that is from about 100 microns to about 1000 microns thick or from about 200 microns to about 600 microns thick. Typically, there are voids that exist between individual or groups of SiC fibers. Following this winding or braiding step, the second component is applied. The second component includes a SiC material which is effective to at least partially fill the voids formed between the SiC fibers in the first component. The second component is deposited or applied by employing chemical vapor infiltration (CVI) or chemical vapor deposition (CVD) technology. In certain embodiments, CVI or CVD application forms a second component layer or coating on the first component layer or coating. As used herein and the claims, CVI refers to depositing ceramic matrix material in pores using decomposed gaseous ceramic matrix precursors and CVD refers to depositing ceramic matrix material on surfaces using decomposed gaseous ceramic matrix precursors. The density of the second exterior coating can vary and in certain embodiments, is from about 50% to about 100% of the theoretical SiC density of about 3.22 grams/cm$^3$, or from about 75% to about 95% theoretical density. Further, as a result of filling the voids between the fibers with the CVI or CVD process, the second exterior coating can at least substantially and preferably, completely, encase the Zr alloy tubular cladding structure including the first and second end plugs. In certain embodiments, the Zr alloy cladding structure is at least 99% encased in the second exterior coating.

In certain embodiments, CVI is conducted at temperatures from about 300° C. to about 1100° C. depending on the particular CVI process and apparatus employed. Traditional decomposition-based CVI occurs from about 900° C. to about 1100° C. In certain embodiments, atomic layer deposition-based SiC deposition is carried out at temperatures from about 300° C. to about 500° C.

The second component, e.g., SiC material, in the second exterior coating which is applied by CVI or CVD to fill the voids, may include a variety of compositions. Suitable examples are disclosed in U.S. patent application Ser. No. 14/205,799 which is incorporated herein by reference.

The overall tube wall thickness of a Zr alloy cladding with coating in accordance with the invention is significantly less than the thickness of a 100% SiC tube exhibiting the same or similar hermeticity and strength in the absence of a coating.

The coated cladding of the invention provides a SiC protective layer that is capable of holding together the cladding tube including end plugs and keeping the temperature rise due to corrosion-generated self-heating to a minimum to temperatures greater than 1800° C., which is significantly higher than the temperatures at which corrosion of other metal alloys and, in particular, significantly higher than Zr alloys alone, i.e., in the absence of the SiC protective layer begin to increase.

Furthermore, the overall neutron cross-section of the cladding tube manufactured in accordance with the invention may be less than that of a conventional Zr alloy tube alone since the wall thickness is supported by a SiC layer. Thus, a significantly thicker wall can be used since the SiC has a cross-section only 25% of that of Zr alloys.

Figure 2:
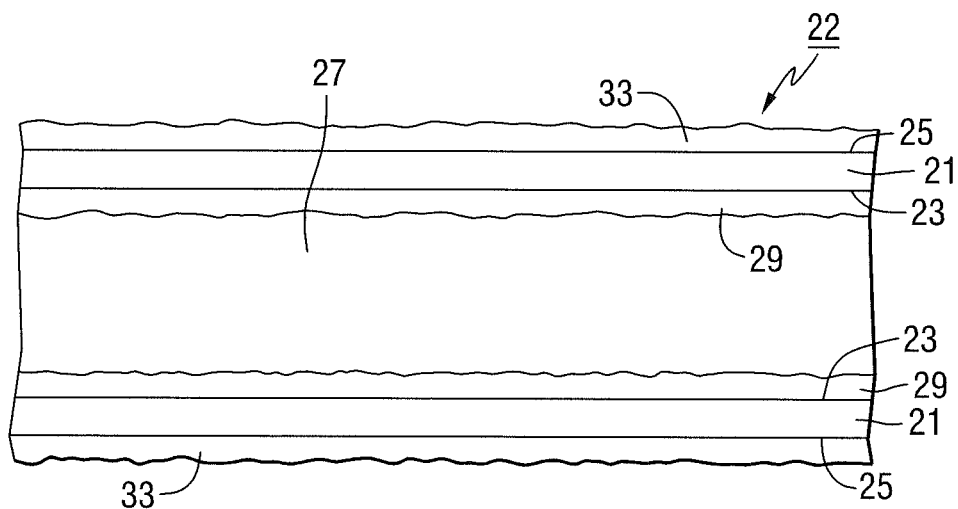
FIG. 2 is a cross-sectional view of a fuel rod cladding substrate having a first coating deposited on the interior surface, in accordance with certain embodiments of the invention.

FIG. 2 illustrates a fuel rod cladding 22 in accordance with certain embodiments of the invention. The cladding 22 includes an elongated tube wall 21 having an interior surface 23, an exterior surface 25, and forming a cavity 27. An oxidation resistant coating composition is deposited on the interior surface 23 and/or exterior surface 25 of the cladding 22 to form a first coating 29 on the interior surface 23 and/or a first coating 33 on the exterior surface 25.

Figure 3:
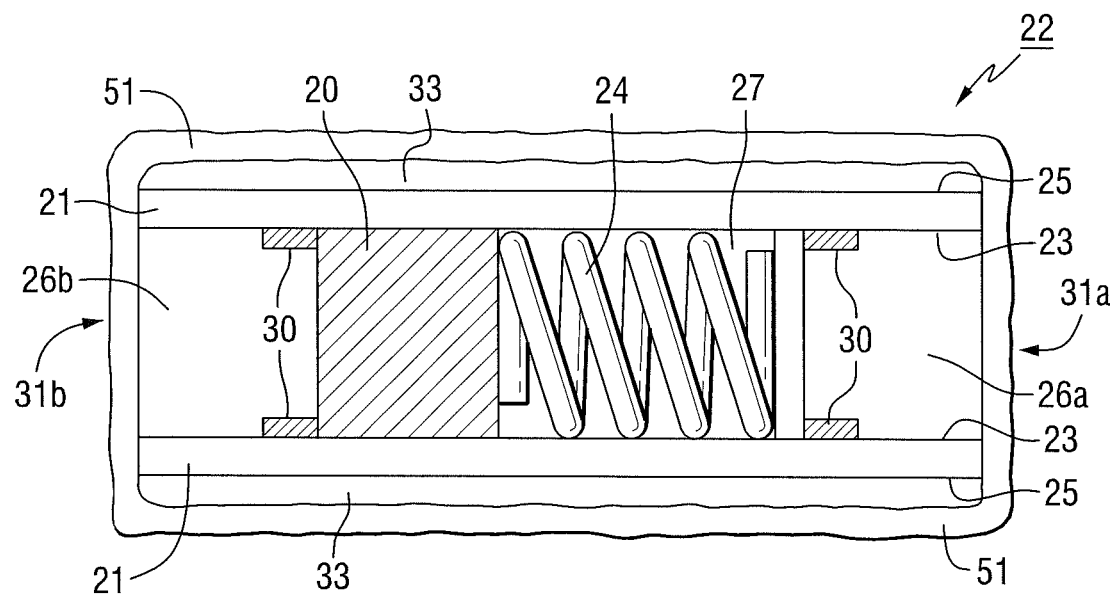
FIG. 3 is a cross-sectional view of a fuel rod cladding substrate having a first coating and a second coating deposited on the exterior surface, in accordance with certain embodiments of the invention.

FIG. 3 illustrates a fuel rod cladding 22 in accordance with certain embodiments of the invention. FIG. 3 includes the elongated tube wall 21, interior surface 23, exterior surface 25, and cavity 27, as shown in FIG. 2. In addition, FIG. 3 shows a stack of fuel pellets 20 and a hold down device 24 positioned within the cavity 27, and a first end 31a and a second end 31b. A first end plug 26a is positioned and secured in the first end 31a and a second end plug 26b is positioned and secured in the second end 31b. The mechanism of securing the first and second end plugs 26a,b may include a seal which includes a joint of brazing material 30. In certain embodiments, the seal can be formed by a weld of the end plugs 26a,b to the ends 31a,b. As shown in FIG. 3, an oxidation resistant composition is deposited on the exterior surfaces 25 of the cladding tube 22 to form a first coating 33. As described herein, it is contemplated that a first coating can be deposited on both the interior surface 23 (e.g., coating 29 as shown in FIG. 2) and the exterior surface 25 (e.g., coating 33 as shown in FIG. 3). FIG. 3 also shows a second coating 51 formed on an outer surface of the first coating 33 on the exterior surface 25 of the cladding tube 22 and the surfaces of the first and second end plugs 26a,b. The second coating 51 is effective to completely enclose or encapsulate the cladding tube 22 including the end plugs 26a,b.

Figure 4:
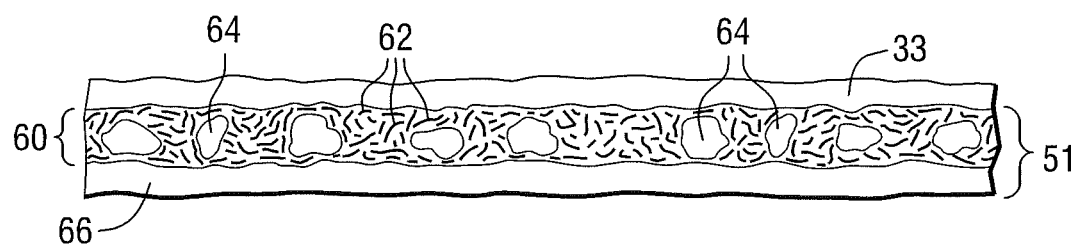
FIG. 4 is a cross-sectional detailed view of the second coating shown in FIG. 3, in accordance with certain embodiments of the invention.

As shown in FIG. 4, the second coating 51 (shown in FIG. 3) includes a layer 60 of SiC reinforcement fibers 62 deposited on the outer surface of the first coating 33 (shown in FIGS. 2 and 3). Between the fibers 62 are shown voids 64. A SiC coating 66 is applied by CVI or CVD to the layer 60 of SiC reinforcement fibers 62 to fill the voids 64.

Figure 5:
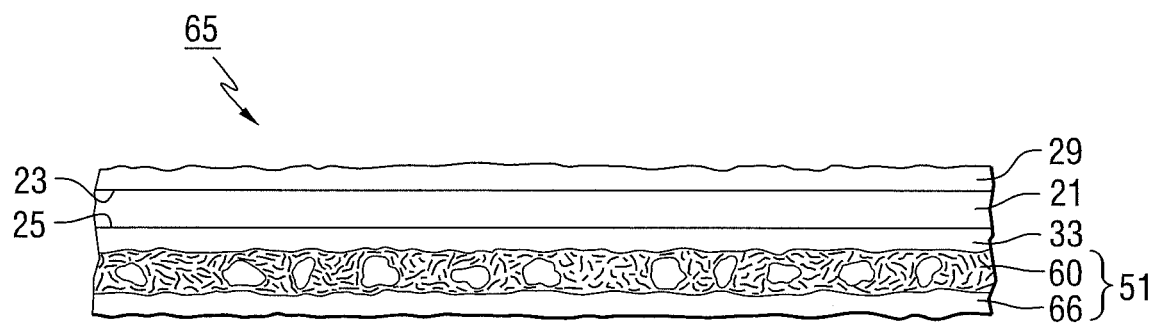
FIG. 5 is a cross-sectional view of a substrate having a first coating on both the internal and external surfaces and a second coating on the external surface, in accordance with certain embodiments of the invention.

FIG. 5 shows a substrate 65 which is representative of a coated fuel rod cladding surface. As shown in FIG. 5, substrate 65 includes the elongated tube wall 21 and, its interior and exterior surfaces 23,25. The first coating 29 is optionally deposited on the interior surface 23 and the first coating 33 is deposited on the exterior surface 25. The second coating 51 is deposited on the first coating 33. The second coating 51 includes the SiC fiber layer 60 and the SiC coating 66.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of preparing a ceramic-containing composite nuclear fuel rod cladding for a nuclear water reactor, comprising:
   providing a zirconium alloy tube, comprising:
      a tubular wall having an interior surface and an exterior surface;
      a cavity formed by the tubular wall;

a first end opening; and
a second end opening;
providing a first end plug having a first outer surface;
providing a second end plug having a second outer surface;
inserting the first end plug into the first end opening, wherein the first outer surface forms a first exterior end of the cladding;
sealing the first end plug;
filling the fuel rod cladding with nuclear fuel and a hold down device;
inserting the second end plug into the second end opening, wherein the second outer surface forms a second exterior end of the cladding;
sealing the second end plug;
pressurizing the cavity;
applying a first composition comprising an oxidation resistant material, to at least a portion of the exterior surface of the tubular wall of the zirconium alloy tube to form a first exterior coating;
following the sealing of the first and the second end plugs, applying a second composition to at least a portion of the first exterior coating to form a second exterior coating, the second exterior coating comprising:
SiC reinforced fibers having voids formed between at least a portion of the SiC reinforced fibers; and
a SiC material to at least partially fill the voids formed between at least a portion of the SiC reinforced fibers; and
applying the second composition to the first outer surface of the first end plug and the second outer surface of the second end plug,
wherein the second composition substantially encapsulates the exterior surface of the cladding including the first and second exterior ends.

2. The method of claim 1, further comprising applying the first composition on the interior surface of the tubular wall of the zirconium alloy tube to form a first interior coating thereon.

3. The method of claim 2, wherein applying of the first interior coating and applying of the first exterior coating is conducted by atomic layer deposition.

4. The method of claim 2, wherein the first interior coating and the first exterior coating have a thickness in a range of 10 nanometers to 10 microns.

5. The method of claim 2, wherein the applying of the first interior coating is conducted when only one of the first end plug and the second end plug is positioned within the first open end and the second open end, respectively, of the zirconium alloy tube.

6. The method of claim 1, wherein the applying of the first exterior coating and the second exterior coating is conducted when the first and the second end plugs are positioned in each of the first and the second ends of the zirconium alloy tube.

7. The method of claim 1, wherein the depositing of the SiC reinforced fibers is conducted by winding or braiding.

8. The method of claim 1, wherein the SiC reinforced fibers form a layer having a thickness from about 10 mils to about 40 mils.

9. The method of claim 1, wherein the second exterior coating has a density from about 2.5 and about 3.22 grams/cm$^3$.

10. The method of claim 1, wherein the oxidation resistant material selected from the group consisting of $Al_2O_3$, $Cr_2O_3$, and mixtures thereof.

11. The method of claim 1, wherein the second composition substantially encapsulates the exterior surface of the cladding including the first and second exterior ends.

12. A ceramic-containing composite nuclear fuel rod cladding for a nuclear water reactor, comprising:
a zirconium alloy tube comprising a tubular wall having an interior surface and an exterior surface;
a cavity formed by the tubular wall, the cavity having nuclear fuel disposed therein;
a first end opening;
a second end opening;
a first end plug having a first outer surface inserted in the first end opening,
wherein the first outer surface forms a first exterior end of the cladding;
a second end plug having a second outer surface inserted in the second end opening,
wherein the second outer surface forms a second exterior end of the cladding;
a first composition deposited on at least a portion of the exterior surface of the tubular wall of the zirconium alloy tube to form a first exterior coating, said first composition comprising an oxidation resistant material;
a second composition deposited on at least a portion of the first exterior coating to form a second exterior coating, said second exterior coating comprising:
a plurality of SiC reinforced fibers deposited on said first exterior coating to form a fiber layer, said fibers having voids formed therebetween; and
a SiC material at least partially applied to the fiber layer to at least partially fill the voids; and
the second composition deposited on the first outer surface of the first end plug and the second outer surface of the second end plug.

13. The cladding of claim 12, further comprising applying the first composition on the interior surface of the tubular wall of the zirconium alloy tube to form a first interior coating thereon.

14. The cladding of claim 12, wherein the depositing of the first exterior coating and the second exterior coating is conducted when the first and the second end plugs are positioned in each of the first and the second ends of the zirconium alloy tube.

15. The cladding of claim 12, wherein the first and the second end plugs are constructed of metal.

16. The cladding of claim 12, wherein the oxidation resistant material does not comprise a material selected from the group consisting of SiC and a SiC-containing compound.

* * * * *